US012587716B2

(12) United States Patent
Zhang et al.

(10) Patent No.: US 12,587,716 B2
(45) Date of Patent: Mar. 24, 2026

(54) VIRTUAL LIVE-STREAMING CONTROL METHOD AND APPARATUS

(71) Applicant: Hangzhou AliCloud Apsara Information Technology Co., Ltd., Hangzhou (CN)

(72) Inventors: Yuxin Zhang, Hangzhou (CN); Lin Rui, Hangzhou (CN)

(73) Assignee: HANGZHOU ALICLOUD APSARA INFORMATION TECHNOLOGY CO., LTD., Hangzhou (CN)

( * ) Notice: Subject to any disclaimer, the term of this patent is extended or adjusted under 35 U.S.C. 154(b) by 56 days.

(21) Appl. No.: 18/730,715

(22) PCT Filed: Jan. 19, 2023

(86) PCT No.: PCT/CN2023/073053
§ 371 (c)(1),
(2) Date: Jul. 19, 2024

(87) PCT Pub. No.: WO2023/138640
PCT Pub. Date: Jul. 27, 2023

(65) Prior Publication Data
US 2025/0234073 A1 Jul. 17, 2025

(30) Foreign Application Priority Data
Jan. 20, 2022 (CN) .......................... 202210068130.3

(51) Int. Cl.
*H04N 21/81* (2011.01)
*H04N 21/2187* (2011.01)
(Continued)

(52) U.S. Cl.
CPC ..... *H04N 21/8146* (2013.01); *H04N 21/2187* (2013.01); *H04N 21/4316* (2013.01);
(Continued)

(58) Field of Classification Search
CPC ........... H04N 21/8146; H04N 21/2187; H04N 21/4316; H04N 21/47205; H04N 21/488;
(Continued)

(56) References Cited

U.S. PATENT DOCUMENTS 10,250,953 B1 * 4/2019 Murali ............... H04N 21/4312
10,832,736 B2 * 11/2020 Gibbon .................. G11B 27/28
(Continued)

FOREIGN PATENT DOCUMENTS

CN 109087170 A 12/2018
CN 110162661 A 8/2019
(Continued)

OTHER PUBLICATIONS

Extended European Search Report dated Mar. 5, 2025 for European Application No. 23742955.0.
(Continued)

*Primary Examiner* — Sahar Aqil Riaz

(57) ABSTRACT

Embodiments of the present disclosure provide a virtual live-streaming control method and apparatus, where the virtual live-streaming control method includes: setting up a virtual character to perform information broadcasting of first type information and second type information related to a live-streaming theme in a live-streaming room; driving the virtual character to broadcast at least one piece of the first type information and the second type information according to a preset broadcast rule; acquiring a pre-generated material to be broadcast corresponding to the first type information and a transaction link of a target object associated with the second type information; displaying the material to be broadcast in the live-streaming room when the virtual character broadcasts the first type information; and displaying the transaction link in the live-streaming room when the virtual character broadcasts the second type information.

20 Claims, 7 Drawing Sheets

(51) Int. Cl.

| | |
|---|---|
| *H04N 21/431* | (2011.01) |
| *H04N 21/472* | (2011.01) |
| *H04N 21/488* | (2011.01) |
| *H04N 21/858* | (2011.01) |

(52) U.S. Cl.
CPC ..... *H04N 21/47205* (2013.01); *H04N 21/488* (2013.01); *H04N 21/858* (2013.01)

(58) Field of Classification Search
CPC ............. H04N 21/858; H04N 21/4788; H04N 21/812; H04N 21/8126; H04N 21/47815; H04N 21/478
USPC .......................................................... 725/37
See application file for complete search history.

(56) References Cited

U.S. PATENT DOCUMENTS

| | | | | |
|---|---|---|---|---|
| 10,872,116 | B1 * | 12/2020 | Yim | G06F 16/61 |
| 11,005,908 | B1 * | 5/2021 | Wu | H04L 65/1069 |
| 11,770,588 | B2 * | 9/2023 | Gupta | H04N 21/8455 |
| | | | | 725/88 |
| 12,096,046 | B2 * | 9/2024 | Xue | H04L 65/762 |
| 2007/0143493 | A1 * | 6/2007 | Mullig | H04L 65/752 |
| | | | | 709/232 |
| 2010/0324941 | A1 * | 12/2010 | Stevenson | G06N 3/006 |
| | | | | 705/26.1 |
| 2018/0262782 | A1 * | 9/2018 | Mateik | H04N 21/84 |
| 2019/0253751 | A1 * | 8/2019 | Lin | H04N 21/4316 |
| 2020/0413156 | A1 * | 12/2020 | Zeiler | H04N 21/4312 |
| 2021/0321061 | A1 * | 10/2021 | Kawakami | H04N 21/8146 |
| 2022/0210500 | A1 * | 6/2022 | Sun | G06F 3/04886 |
| 2023/0023085 | A1 * | 1/2023 | Zhu | G06T 13/40 |
| 2023/0209125 | A1 * | 6/2023 | Liu | H04N 21/4788 |
| | | | | 725/32 |
| 2023/0308724 | A1 * | 9/2023 | Yang | H04N 21/4788 |
| 2023/0328330 | A1 * | 10/2023 | He | H04N 21/2743 |
| | | | | 725/37 |
| 2024/0040161 | A1 * | 2/2024 | Chang | H04N 21/23424 |

FOREIGN PATENT DOCUMENTS

| | | |
|---|---|---|
| CN | 110381266 A | 10/2019 |
| CN | 113194350 A | 7/2021 |
| CN | 113448475 A | 9/2021 |
| CN | 113542370 A | 10/2021 |
| CN | 113825031 A | 12/2021 |
| CN | 114125491 A | 3/2022 |
| WO | WO2017107831 A1 | 6/2017 |
| WO | WO2019134173 A1 | 7/2019 |
| WO | WO2021112807 A1 | 6/2021 |

OTHER PUBLICATIONS

International Search Report and Written Opinion dated Mar. 12, 2023 for International Application No. PCT/CN2023/073053.

Notification to Grant Patent Right for Invention dated Apr. 25, 2022 for Chinese Application No. 202210068130.3.

The Second Office Action dated Apr. 15, 2022 for Chinese Application No. 202210068130.3.

The First Office Action dated Mar. 17, 2022 for Chinese Application No. 202210068130.3.

* cited by examiner

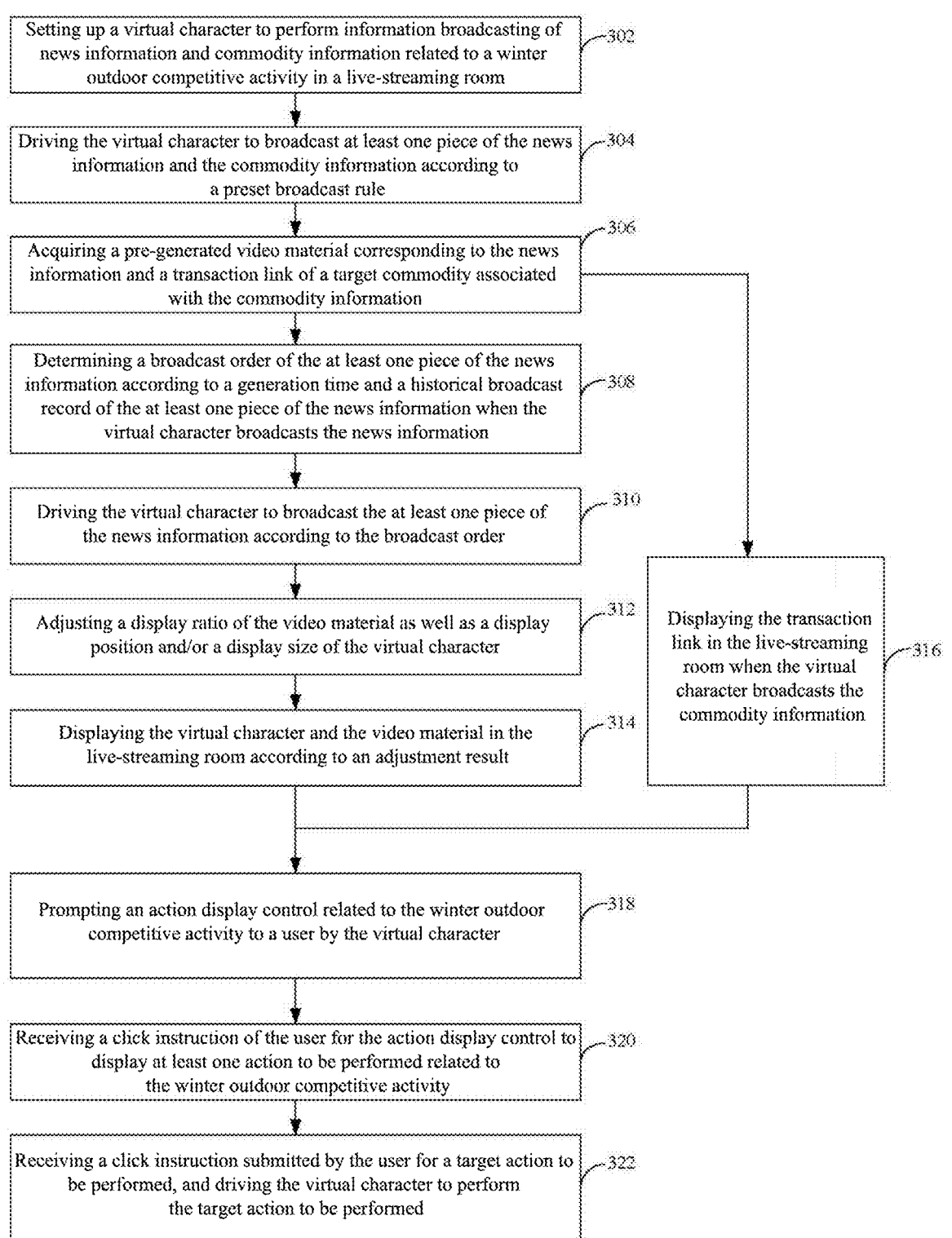

Setting up a virtual character to perform information broadcasting of news information and commodity information related to a winter outdoor competitive activity in a live-streaming room ⟋302

Driving the virtual character to broadcast at least one piece of the news information and the commodity information according to a preset broadcast rule ⟋304

Acquiring a pre-generated video material corresponding to the news information and a transaction link of a target commodity associated with the commodity information ⟋306

Determining a broadcast order of the at least one piece of the news information according to a generation time and a historical broadcast record of the at least one piece of the news information when the virtual character broadcasts the news information ⟋308

Driving the virtual character to broadcast the at least one piece of the news information according to the broadcast order ⟋310

Adjusting a display ratio of the video material as well as a display position and/or a display size of the virtual character ⟋312

Displaying the virtual character and the video material in the live-streaming room according to an adjustment result ⟋314

Displaying the transaction link in the live-streaming room when the virtual character broadcasts the commodity information ⟋316

Prompting an action display control related to the winter outdoor competitive activity to a user by the virtual character ⟋318

Receiving a click instruction of the user for the action display control to display at least one action to be performed related to the winter outdoor competitive activity ⟋320

Receiving a click instruction submitted by the user for a target action to be performed, and driving the virtual character to perform the target action to be performed ⟋322

FIG. 3

VIRTUAL LIVE-STREAMING CONTROL METHOD AND APPARATUS

CROSS-REFERENCE TO RELATED APPLICATIONS

This application is a National Stage of International Application No. PCT/CN2023/073053, filed on Jan. 19, 2023, which claims priority to Chinese Patent Application No. 2022100681303, filed to China National Intellectual Property Administration on Jan. 20, 2022 and entitled "VIRTUAL LIVE-STREAMING CONTROL METHOD AND APPARATUS". The contents of the two applications are hereby incorporated by reference in their entireties.

TECHNICAL FIELD

Embodiments of the present disclosure relate to the field of computer technology, and in particular, to a virtual live-streaming control method.

BACKGROUND

With the rise of live-streaming platforms, more and more users use live-streaming to promote various information in a live-streaming room of the live-streaming platform, such as e-commerce on the live-streaming platform, teaching on the live-streaming platform, and performing on the live-streaming platform.

In order to enhance the interestingness and interactivity of live-streaming, virtual image live-streaming, as a very important part of live-streaming services, has occupied an increasing proportion of live-streaming services in recent years.

However, at present, in the live-streaming platform, the live-streaming method of live-streaming apartment is fixed and single, which can not better meet the user's requirements. Therefore, an effective method is urgently needed to solve such problem.

SUMMARY

In view of this, embodiments of the present disclosure provide a virtual live-streaming control method. One or more embodiments of the present disclosure simultaneously relate to a virtual live-streaming control apparatus, a computing device, a computer-readable storage medium, and a computer program to address technical deficiencies existing in the prior art.

According to a first aspect of an embodiment of the present disclosure, a virtual live-streaming control method is provided, including:

setting up a virtual character to perform information broadcasting of first type information and second type information related to a live-streaming theme in a live-streaming room, where the first type information has a knowledge attribute, and the second type information has a transaction attribute;

driving the virtual character to broadcast at least one piece of the first type information and the second type information according to a preset broadcast rule;

acquiring a pre-generated material to be broadcast corresponding to the first type information and a transaction link of a target object associated with the second type information;

displaying the material to be broadcast in the live-streaming room when the virtual character broadcasts the first type information; and displaying the transaction link in the live-streaming room when the virtual character broadcasts the second type information, where, in a case that a user is detected to click on the transaction link, the live-streaming room jumps to a transaction interface of an object transaction platform.

According to a second aspect of an embodiment of the present disclosure, a virtual live-streaming control apparatus is provided, including:

a setup module, configured to set up a virtual character to perform information broadcasting of first type information and second type information related to a live-streaming theme in a live-streaming room, where the first type information has a knowledge attribute, and the second type information has a transaction attribute;

a driving module, configured to drive the virtual character to broadcast at least one piece of the first type information and the second type information according to a preset broadcast rule;

an acquisition module, configured to acquire a pre-generated material to be broadcast corresponding to the first type information and a transaction link of a target object associated with the second type information;

a first display module, configured to display the material to be broadcast in the live-streaming room when the virtual character broadcasts the first type information; and a second display module, configured to display the transaction link in the live-streaming room when the virtual character broadcasts the second type information, where, in a case that a user is detected to click on the transaction link, the live-streaming room jumps to a transaction interface of an object transaction platform.

According to a third aspect of an embodiment of the present disclosure, a computing device is provided, including:

a memory and a processor;

where the memory is configured to store computer executable instructions, and the processor is configured to execute the computer executable instructions to implement the steps of any of the virtual live-streaming control method.

According to a fourth aspect of an embodiment of the present disclosure, a computer-readable storage medium is provided, which stores a computer-executable instruction, when the instruction is executed by a processor, the steps of any of the virtual live-streaming control method are implemented.

According to a fifth aspect of an embodiments of the present disclosure, a computer program is provided, when the computer program is executed in a computer, the computer is caused to execute the steps of the virtual live-streaming control method.

An embodiment of the present disclosure sets up a virtual character to perform information broadcasting of first type information and second type information related to a live-streaming theme in a live-streaming room, where the first type information has a knowledge attribute, and the second type information has a transaction attribute; drives the virtual character to broadcast at least one piece of the first type information and the second type information according to a preset broadcast rule; acquires a pre-generated material to be broadcast corresponding to the first type information and a transaction link of a target object associated with the second type information; displays the material to be broadcast in the live-streaming room when the virtual character broadcasts the first type information; and displays the transaction link in the live-streaming room when the virtual character broadcasts the second type information, where, in a case that a user is detected to click on the transaction link, the live-streaming room jumps to a transaction interface of an object transaction platform.

In an implementation of the present disclosure, in the process of setting up the virtual character to broadcast information related to a certain live-streaming theme in the live-streaming room, in addition to broadcasting the first type information with the transaction attribute related to the live-streaming theme in the live-streaming room through the virtual character to realize object transactions, the second type information with the knowledge attribute can also be broadcast through the virtual character to realize the dissemination and popularization of this type information. Therefore, broadcasting different types of information related to the live-streaming theme is conducive to enhancing the interestingness and interaction of live-streaming, and at the same time is conducive to realizing the diversity of live-streaming methods, so as to better meet the user's requirements for different types of information.

BRIEF DESCRIPTION OF DRAWINGS

FIG. 3 is a process flow diagram of a virtual live-streaming control method provided by an embodiment of the present disclosure.

DESCRIPTION OF EMBODIMENTS

Figure 1:
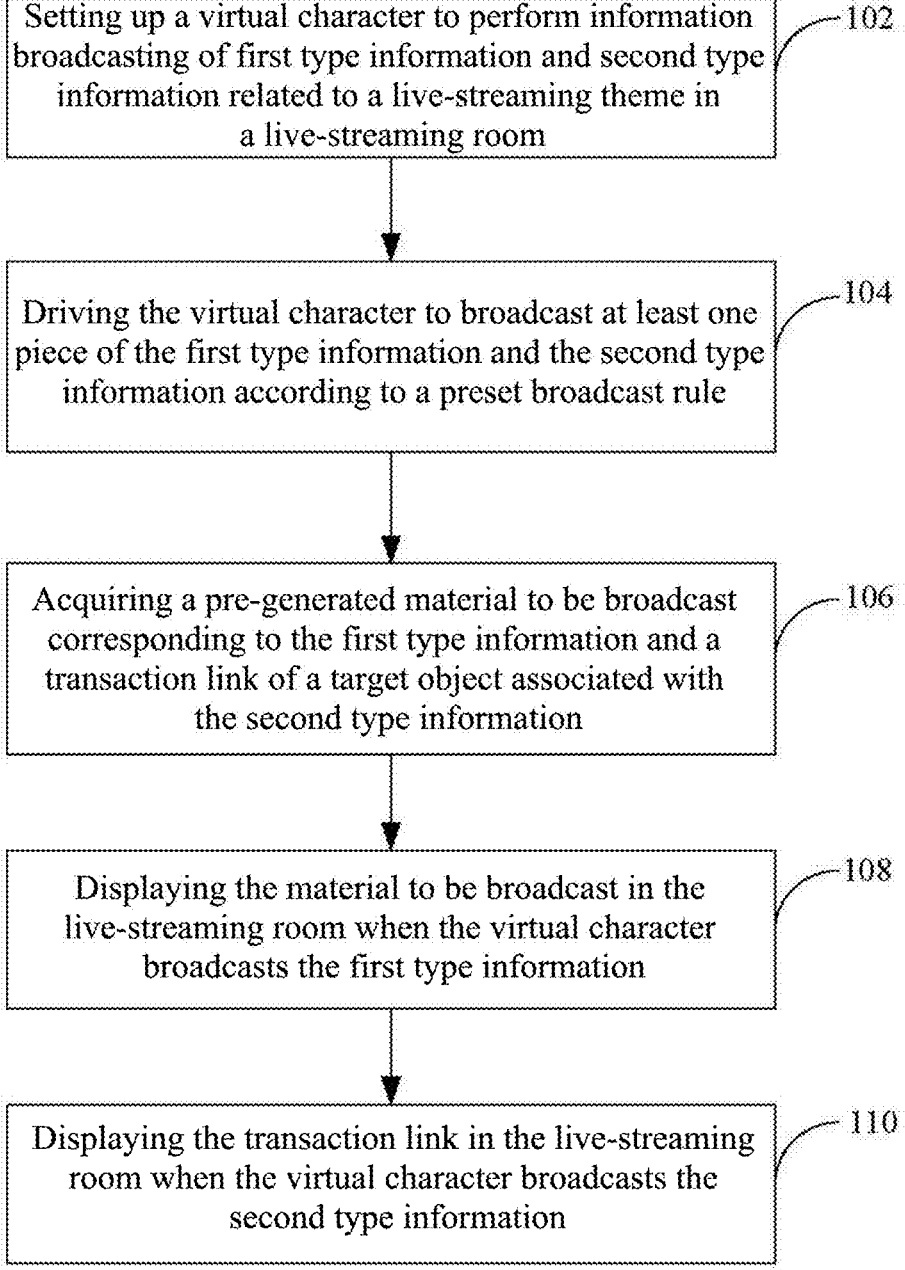
FIG. 1 is a flow diagram of a virtual live-streaming control method provided by an embodiment of the present disclosure.

Many specific details are given in the following description to facilitate a full understanding of the present disclosure. However, the present disclosure may be implemented in many ways different from those described herein, and persons skilled in the art may do similar promotion without violating the intension of the present disclosure, and therefore the present disclosure is not subject to the specific implementation disclosed below.

Terms used in one or more embodiments of the present disclosure are used solely for the purpose of describing specific embodiments and are not intended to limit one or more embodiments of the present disclosure. The terms "a", "said" and "the" in the singular form as used in one or more embodiments of the present disclosure and the accompanying claims are also intended to include the majority form, unless the context clearly indicates otherwise. It should also be understood that the term "and/or" as used in one or more embodiments of the present disclosure refers to and encompasses any or all possible combinations of one or more related listed items.

It should be understood that although the terms first and second classes may be used to describe various information in one or more embodiments of the present disclosure, such information should not be limited to these terms. These terms are used only to distinguish the same type information from one another. For example, without departing from the scope of one or more embodiments of the present disclosure, the first may also be referred to as the second, and likewise the second may be referred to as the first. Depending on the context, the word "if" as used here can be interpreted as "at time of . . ." or "when . . ." or "in response to determination of".

First, noun terms involved in one or more embodiments of the present disclosure is explained.

Digital human: a virtual human with a digital form that has abilities to express itself with words, facial expressions, and body movements.

Live-streaming room: each live stream's presentation window corresponds to one live-streaming room. The live-streaming room is unique in a service platform.

Virtual live-streaming room: a digital human anchor and a digital live-streaming room constructed by digital drive technology provide live-streaming content in an interactive way of live-streaming by artificial man, which can also be understood as a live-streaming apartment with a specific type (a type of live-streaming by a virtual character as an anchor in a live-streaming room) in a live-streaming room. For example, it may include but not limited to game live-streaming room, film live-streaming room, life live-streaming room, comprehensive live-streaming room, etc. The virtual live-streaming room here can be any live-streaming apartment, and the virtual live-streaming room can include digital human anchors, scenes, live-streaming text and other components.

At present, there are solutions that use a virtual character to conduct e-commerce in the live-streaming room on the market, most of which are two solutions: (1) a script is edited by human beings and broadcast by the virtual character; (2) driving the virtual character to conduct e-commerce by using the way of real people reproduction. The first solution relies heavily on manual operation, and all broadcast scripts need to be manually edited, which requires great operating costs. This solution can not interact with the audience in the live-streaming room, but is only one-way commodity broadcasting. The second solution requires additional hardware to drive the virtual character, and its format is consistent with the live-streaming, with a live host behind it.

The embodiment of the present disclosure provides a virtual live-streaming control method. In the process of setting up the virtual character to broadcast information related to a certain live-streaming theme in the live-streaming room, in addition to broadcasting the first type information with the transaction attribute related to the live-streaming theme in the live-streaming room through the virtual character to realize object transactions, the second type information with the knowledge attribute can also be broadcast through the virtual character to realize the dissemination and popularization of this type information. Therefore, broadcasting different types of information related to the live-streaming theme is conducive to enhancing the interestingness and interaction of live-streaming, and at the same time is conducive to realizing the diversity of live-streaming methods, so as to better meet the user's requirements for different types of information.

In the present disclosure, a virtual live-streaming control method is provided. The present disclosure also relates to a virtual live-streaming control apparatus, a computing device, a computer readable storage medium, and a computer program, which are described in detail in the following embodiments.

FIG. 1 shows a flow diagram of a virtual live-streaming control method provided according to an embodiment of the present disclosure, including the following steps specifically.

Step 102, setting up a virtual character to perform information broadcasting of first type information and second type information related to a live-streaming theme in a live-streaming room, where the first type information has a knowledge attribute, and the second type information has a transaction attribute.

Specifically, the live-streaming room is usually used for live-streaming of a commodity or a game, but in a case of a special live-streaming theme, the virtual character in the live-streaming room can be set up to carry out a live-streaming around the live-streaming theme. The live-streaming theme can be a medium, medium-large or large scale event, competition or conference.

The first type information related to the live-streaming theme has the knowledge attribute. For example, the first type information can be non-entity objects such as news information and encyclopedia information related to the live-streaming theme. The second type information related to the live-streaming theme has the transaction attribute. For example, the second type information can be entity objects such as commodities or tradable resources related to the live-streaming theme.

Therefore, in order to ensure the comprehensiveness and integrity of the broadcast of information related to the live-streaming theme, the virtual character can broadcast different types of information related to the live-streaming theme during the process of setting up the virtual character to carry out live-streaming around the live-streaming theme.

The virtual live-streaming control method provided by the embodiment of the present disclosure, setting up the virtual character to carry out live-streaming can ensure that the virtual character can carry out live-streaming all day without interruption, which not only can increase the interestingness of the virtual character live-streaming, but also can fill a time gap of real anchors live-streaming, so that the audience can watch different types of information related to the live-streaming theme at any time.

Step 104, driving the virtual character to broadcast at least one piece of the first type information and the second type information according to a preset broadcast rule.

Specifically, the preset broadcast rule refers to the broadcast rule of different types of information related to the live-streaming theme. For example, the preset broadcast rule can be to broadcast the first type information first, then broadcast the second type information, and then broadcast the third type information. Or, a broadcast duration of the first type information is 10 minutes, and a broadcast duration of the second type information is 15 minutes.

Therefore, on the basis of setting up the virtual character to perform information broadcasting of different types of information related to the live-streaming theme in the live-streaming room, the virtual character can also be driven to carry out alternate broadcasting (oral broadcasting) of different types of information. For example, the virtual character can be driven to broadcast the first type information for 10 min, then broadcast the second type information for 10 min, and then broadcast the first type information for 10 min, so that the first type information and the second type information are alternately broadcast. Or, the virtual character can be driven to broadcast 5 pieces of the first type information, then broadcast 5 pieces of the second type information, then broadcast 5 of the first type information, and so on.

In specific implementation, the driving the virtual character to broadcast the at least one piece of the first type information and the second type information according to the preset broadcast rule includes: driving the virtual character to broadcast at least one piece of the first type information according to the preset broadcast rule; driving the virtual character to broadcast at least one piece of the second type information in a case that it is detected that a broadcasting quantity of the first type information meets a first preset quantity threshold; and returning to perform the step of driving the virtual character to broadcast the at least one piece of the first type information in a case that it is detected that a broadcasting quantity of the second type information meets a second preset quantity threshold.

Specifically, if the preset broadcast rule is: in a case that the broadcasting quantity of the first type information meets the first preset quantity threshold, the second type information begins to be broadcast; in a case that the broadcasting quantity of the second type information meets the second preset quantity threshold, the first type information begins to be broadcast. Therefore, whether to continue to broadcast a current type information or to broadcast other types of information can be determined by determining whether the quantity of the current broadcast type information meets a preset quantity threshold.

The first preset quantity threshold and the second preset quantity threshold can be equal or not equal. The specific values of the first preset quantity threshold and the second preset quantity threshold can be determined according to an actual demand, and there is no restriction here.

For example, in a case that the first preset quantity threshold and the second preset quantity threshold are set to 5, and the first type information is currently broadcast, it can be determined whether the broadcasting quantity of the first type information reaches 5 during the broadcast process, if so, the second type information begins to be broadcast. Similarly, during the broadcast process, it can be determined whether the broadcasting quantity of the second type information reaches 5, if so, then the first type information is broadcast, and so on.

Further, the first type information includes news information; accordingly, the driving the virtual character to broadcast the at least one piece of the first type information can be realized in the following ways: determining a broadcast order of at least one piece of the news information according to a generation time and a historical broadcast record of the at least one piece of the news information; and driving the virtual character to broadcast the at least one piece of the news information according to the broadcast order.

Specifically, the first type information has the knowledge attribute. In a case that the first type information is news information, due to the timeliness of the news information, during the broadcast process of the news information, for the news information acquired, the broadcast order of news information to be broadcast can be determined according to the generation time of different news information to be broadcast. Under normal circumstances, the later the generation time of news information to be broadcast, the more priority it can be broadcast, and the earlier the generation time of news information to be broadcast, the later it can be broadcast. After determining the broadcast order of at least one piece of news information, the virtual character can be driven to broadcast the at least one piece of the news information according to the broadcast order.

In practical application, in addition to determining the broadcast order of each piece of news information to be broadcast according to the generation time of the news information, the broadcast order of different news information to be broadcast can also be determined by combining the generation time of the news information and its historical broadcast record. Under normal circumstances, if the generation time of two pieces of news to be broadcast is the same, then if one piece of news has been broadcast, then in a current broadcast process, the other piece of news can be broadcast before that piece of news.

In addition, in addition to determining the broadcast order of different news information to be broadcast according to the generation time and the historical broadcast record of the news information, it can also be determined by combining categories of the news information to be broadcast to ensure the diversity of the categories of the news information broadcast in this round.

In a specific implementation, the driving the virtual character to broadcast the at least one piece of the first type information and the second type information according to a preset broadcast rule can further be realized in the following ways: driving the virtual character to broadcast at least one piece of the first type information according to the preset broadcast rule; driving the virtual character to broadcast at least one piece of the second type information in a case that it is detected that a total broadcast duration of the first type information meets a first preset duration threshold; and returning to drive the virtual character to broadcast the at least one piece of the first type information in a case that it is detected that a total broadcast duration of the second type information meets a second preset duration threshold.

Specifically, if the preset broadcast rule is: in a case that the total broadcast duration of the first type information meets the first preset duration threshold, the second type information begins to be broadcast; in a case that the total broadcast duration of the second type information meets the second preset duration threshold, the first type information begins to be broadcast. Therefore, whether to continue to broadcast a current type information or to broadcast other types of information can be determined by determining whether the total broadcast duration of the current broadcast type information meets a preset duration threshold.

The first preset duration threshold and the second preset duration threshold can be equal or not equal. The specific values of the first preset duration threshold and the second preset duration threshold can be determined according to an actual demand, and there is no restriction here.

For example, in a case that the first preset duration threshold and the second preset duration threshold are set to 10 min, and the first type information is currently broadcast, it can be determined whether the total broadcast duration of the first type information reaches 10 min during the broadcast process, if so, the second type information begins to be broadcast. Similarly, during the broadcast process, it can be determined whether the total broadcast duration of the second type information reaches 10 min, if so, then the first type information is broadcast, and so on.

The embodiments of the present disclosure drive the virtual character to alternately broadcast different types of information, which is conducive to ensuring the diversity, comprehensiveness and completeness of the information broadcast of the live-streaming theme by the virtual character in the live-streaming room.

Step 106, acquiring a pre-generated material to be broadcast corresponding to the first type information and a transaction link of a target object associated with the second type information.

Specifically, the first type information has the knowledge attribute, and the first type information can be non-entity information such as news information and encyclopedia information. Therefore, the driving the virtual character to broadcast the first type information can specifically be driving the virtual character to broadcast the first type information through oral broadcasting (oral accounting).

In practical application, in order to ensure that a user (a user watching live-streaming) can understand the details of the first type information more clearly and accurately based on a broadcast result of the first type information in the live-streaming room, the material to be broadcast corresponding to the first type information is displayed to the user through the interface of the live-streaming room while the virtual character can oral broadcast the first type information. The material to be broadcast can be displayed to the user in the form of text, pictures or videos.

Similarly, the second type information has the transaction attribute, and the second type information can be entity information such as commodities or tradable resources. Therefore, the driving the virtual character to broadcast the second type information can specifically be driving the virtual character to broadcast the second type information through oral broadcasting (oral accounting).

In practical application, in order to ensure the conversion rate of the second type information, that is, to improve the transaction volume of the second type information, the transaction link of the target object associated with the second type information is displayed to the user through the interface of the live-streaming room while the virtual character can oral broadcast the second type information, so as to guide the user to click the transaction link and conduct transactions.

Therefore, when driving the virtual character to broadcast the first type information and the second type information, it can first acquire the pre-generated material to be broadcast corresponding to the first type information and the transaction link of the target object associated with the second type information, so as to display the corresponding material to be broadcast or the transaction link for the user when broadcasting the corresponding type information in the future.

Step 108, displaying the material to be broadcast in the live-streaming room when the virtual character broadcasts the first type information.

Specifically, as mentioned above, the first type information has the knowledge attribute, and the first type information can be non-entity information such as news information and encyclopedia information. Therefore, while driving the virtual character to broadcast the first type information, the material to be broadcast corresponding to the first type information can be displayed to the user through the interface of the live-streaming room.

In a specific implementation, the material to be broadcast includes text material; accordingly, the displaying the material to be broadcast in the live-streaming room when the virtual character broadcasts the first type information is specifically displaying the text material in the live-streaming room according to a target display effect when the virtual character broadcasts the first type information, where the target display effect includes at least one of the following: display form, font, color, size, lace and dynamic effect.

Specifically, in the case that the material to be broadcast is the text material, in the process of driving the virtual character to broadcast the first type information, the text material can be displayed in the live-streaming room according to the target display effect.

In practical application, the text material can be text. The target display effect, includes but not limited to display form, font, color, size, lace, dynamic effects, etc., or can also be displayed in a bubble, or in a heart to display text, etc., which can be specifically determined according to an actual demand, there is no restriction here.

Figure 2A:
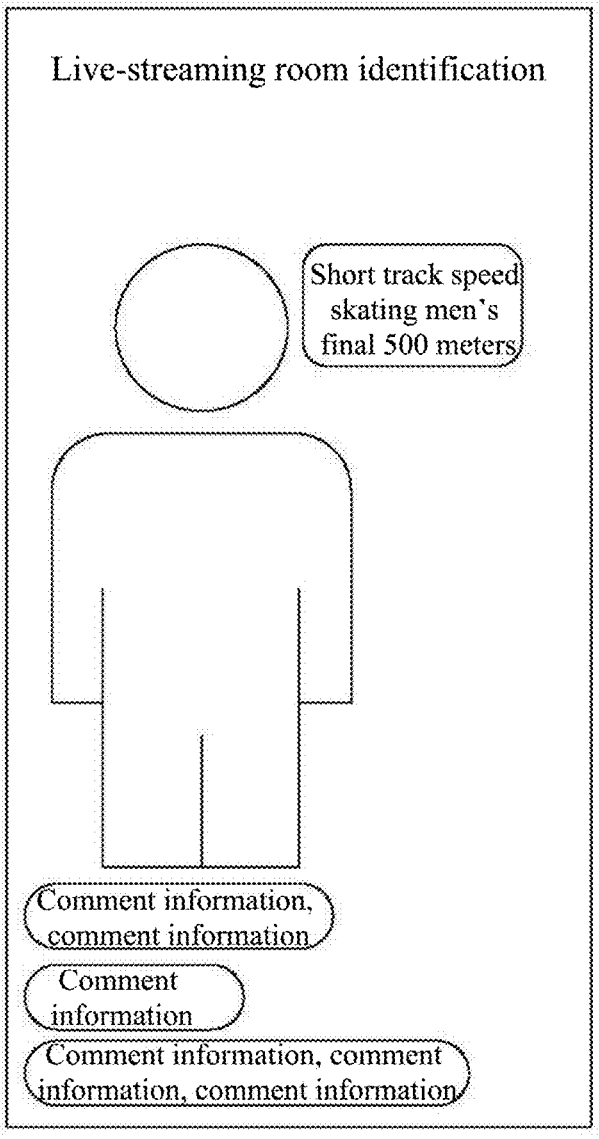
FIG. 2*a* is a schematic diagram of a first display effect provided by an embodiment of the present disclosure.

A schematic diagram of a first display effect provided by an embodiment of the present disclosure is shown in FIG. 2a. When the virtual character broadcasts the first type information, the text corresponding to the first type information can be displayed on the top left of the virtual character through the effect of the bubble.

In a specific implementation, the material to be broadcast includes picture material; accordingly, the displaying the material to be broadcast in the live-streaming room when the virtual character broadcasts the first type information is specifically adjusting a display ratio of the picture material when the virtual character broadcasts the first type information, and displaying the picture material in the live-streaming room according to an adjustment result.

Specifically, in the case that the material to be broadcast is the picture material, in the process of driving the virtual character to broadcast the first type information, the picture material can be displayed in the live-streaming room at the same time.

In practical application, the display ratio of the picture material can be adjusted according to the actual demand, for example, the display ratio of the picture material can be 3:4, 4:3, 16:9, 1:1 and so on.

Figure 2B:
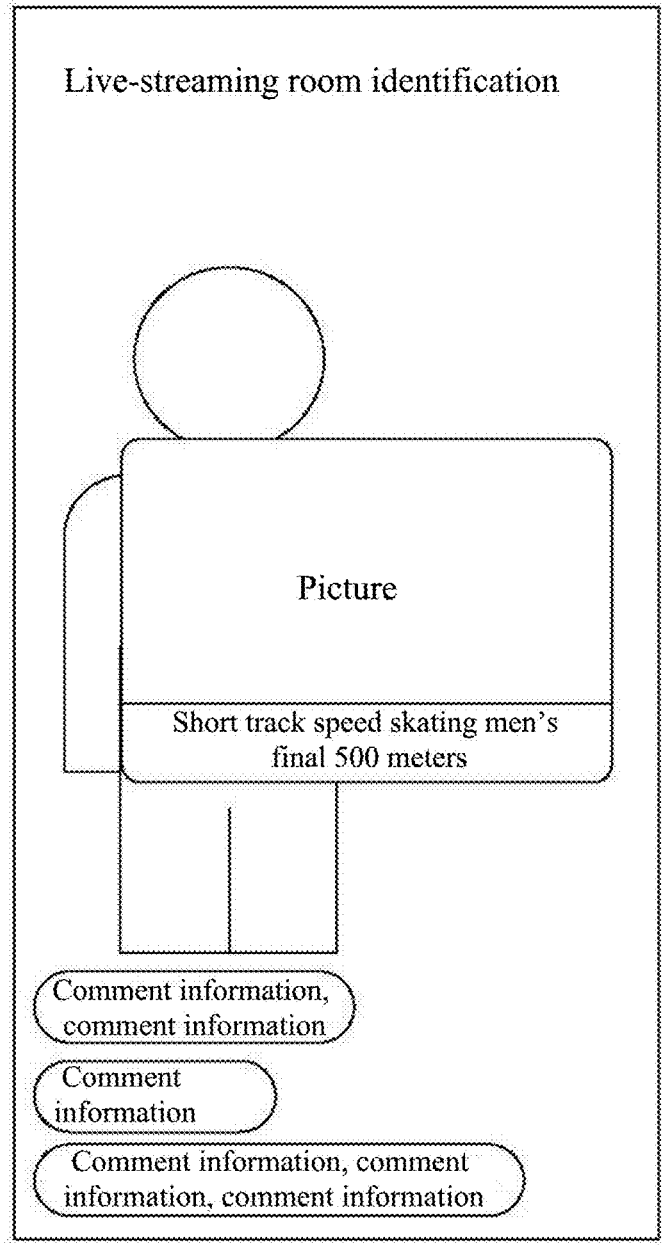
FIG. 2*b* is a schematic diagram of a second display effect provided by an embodiment of the present disclosure.

A schematic diagram of a second display effect provided by an embodiment of the present disclosure is shown in FIG. 2b. When the virtual character broadcasts the first type information, the picture material can be displayed in front of the virtual character according to the target display ratio, and an information title can be displayed below the picture material.

In addition, the material to be broadcast includes video material; accordingly, the displaying the material to be broadcast in the live-streaming room when the virtual character broadcasts the first type information is specifically adjusting a display ratio of the video material as well as a display position and/or a display size of the virtual character when the virtual character broadcasts the first type information; and displaying the virtual character and the video material in the live-streaming room according to an adjustment result.

Specifically, in a case that the material to be broadcast is the video material, in the process of driving the virtual character to broadcast the first type information, the video material can be displayed in the live-streaming room at the same time.

In practical application, the display ratio of the video material can be adjusted according to the actual demand, for example, the display ratio of the video material can be 3:4, 4:3, 16:9, 9:16, 1:1 and so on.

In addition to adjusting the display ratio of the video material, in order to avoid the virtual character from blocking the video material, the display size of the virtual character can also be adjusted, or the display position of the virtual character in the live-streaming interface of the live-streaming room can also be adjusted.

Figure 2C:
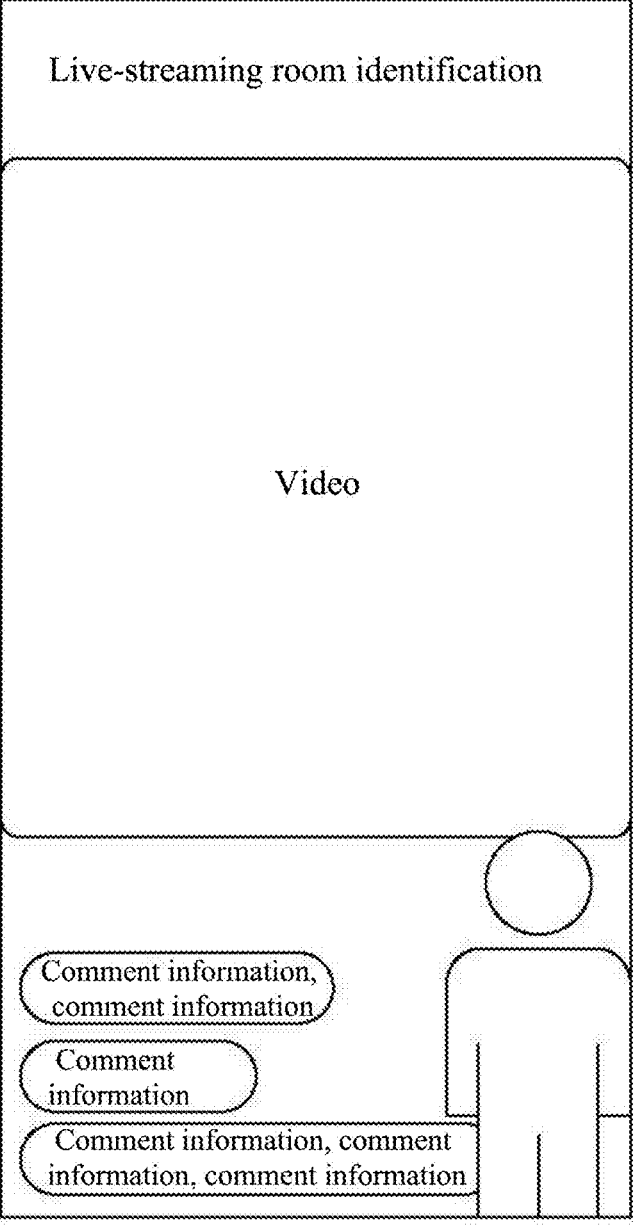
FIG. 2*c* is a schematic diagram of a third display effect provided by an embodiment of the present disclosure.

A schematic diagram of a third display effect provided by an embodiment of the present disclosure is shown in FIG. 2c. When the virtual character broadcasts the first type information, the picture material can be displayed in a corresponding area of the live-streaming interface according to a target display ratio, and the display size and the display position of the virtual character can be adjusted accordingly, so that the virtual character is displayed in the lower right corner of the live-streaming interface.

In conclusion, there are three display modes of news material: plain text, picture+text, video+text. The plain text news is oral broadcast by the virtual character, and a corresponding caption is displayed on the right side of the virtual character. A text of the picture and text news is oral broadcast by the virtual character, and the picture and a corresponding news title are displayed in the live-streaming interface. A text of the video+text news is oral broadcast by the virtual character, after the text broadcast, the virtual character guides the user to watch the video, at this time, an immersive mode is entered, the virtual character shrinks to the lower right corner of the interface, the video is played in full screen immersion. The news information are displays in different ways, which is conducive to enhancing the interestingness of the live-streaming and improving the viewing experience of the user.

Step 110, displaying the transaction link in the live-streaming room when the virtual character broadcasts the second type information, where, in a case that a user is detected to click on the transaction link, the live-streaming room jumps to a transaction interface of an object transaction platform.

Specifically, as mentioned above, the second type information has transaction attribute, and the second type information can be entity information such as commodities or tradable resources. Therefore, the driving the virtual character to broadcast the second type information can specifically be driving the virtual character to broadcast the second type information through oral broadcasting (oral accounting).

In practical application, in order to ensure the conversion rate of the second type information, that is, to improve the transaction volume of the second type information, the transaction link of the target object associated with the second type information is displayed to the user through the interface of the live-streaming room while the virtual character can oral broadcast the second type information, so as to guide the user to click the transaction link. In a case that the user is detected to click on the transaction link, the live-streaming room jumps to the transaction interface of the object transaction platform to guide the user to conduct transactions.

In a specific implementation, theme feedback information submitted by the user in the live-streaming room can also be acquired, and interaction intention information of the user can be predicted based on the theme feedback information. Whether the interaction intention information matches current broadcast type information can be determined. If the interaction intention information does not match the current broadcast type information, next broadcast information can be switched to another type information or a broadcast duration of the current broadcast type information can be shortened. If the interaction intention information matches the current broadcast type information, the broadcast duration of the current broadcast type information can be increased.

Specifically, in the process of broadcasting the first type information and the second type information for the user through live-streaming mode in the live-streaming room, the user can submit the theme feedback information in the live-streaming room, which can be comment information sent by the user, including but not limited to text, expression, image, etc.

After the theme feedback information of the user is acquired, the interaction intention information of the user can be determined according to the theme feedback information, so as to adjust the broadcast rules of different types of information according to the interaction intention information. The interaction intention information can be used to represent the content that the user wants to know or watch.

Among them, the first type information has the knowledge attribute, and the second type information has the transaction attribute. Since it is common to broadcast the second type information with the transaction attribute, it is assumed that in a case that the current broadcast type information is determined to be the second type information, if it is determined that the interaction intention information does not match the second type information, that is, the content that the user wants to know is the content with knowledge attribute rather than the content with transaction attribute, in this case, it can be converted to broadcast the first type information or shorten the broadcast time of the second type information. Or, in a case that the current broadcast type information is determined to be the first type information, if it is determined that the interaction intention information matches the first type information, that is, the content that the user wants to know is the content with knowledge attribute, in this case, the broadcast duration of the first type information can be increased.

The embodiment of the present disclosure can change the broadcast rules of different types of information in the live-streaming room according to the feedback of the user, which is conducive to improving freedom of broadcast content and improving the interactive experience of the user.

In a specific implementation, current broadcast type information in the live-streaming room can be determined, and a display background of the live-streaming room, a character image of the virtual character, a display effect of the material to be broadcast and/or the transaction link in the live-streaming room can be changed according to the current broadcast type information.

Specifically, in the process of driving the virtual character to broadcast different types of information of the live-streaming theme in the live-streaming room, the display background of the live-streaming room, the character image of the virtual character, the display effect of the material to be broadcast and/or the transaction link in the live-streaming room can be switched in real time, so as to match the background, image of the virtual character and/or the display effect of the material to be broadcast and the transaction link to different types of information.

The application of the virtual live-streaming control method provided by an embodiment of the present disclosure to a virtual live-streaming scene of e-commerce is taken as an example. If the live-streaming theme is a skiing competitive activity, the first type information can be news, events, encyclopedias and other information of the skiing activity; the second type information can be a ski suit, a snowboard and other commodity information.

Since the virtual character carries out alternate broadcasting of the first type information and the second type information, when the first type information is broadcast, information such as news, events and encyclopedic of the skiing activity can be used as the background of the live-streaming room. Character clothing of the virtual character can be ordinary wear of daily life, and a hair color of the virtual character can be the daily black or dark brown. In addition, when displaying the material to be broadcast of the first type information, it can be displayed according to the target display effect.

When it is switched to broadcast the second type information, the background of the live-streaming room can be changed to a map of a ski area, the character clothing of the virtual character can be changed to the ski suit, and the hair color of the virtual character can be changed to a color matching the color of the ski suit.

In a specific implementation, theme interaction information related to the live-streaming theme can be prompted to the user by the virtual character; multiple pieces of theme feedback information of the user related to the theme interaction information can be acquired; and the virtual character can be driven to perform a corresponding action to be performed based on the multiple pieces of theme feedback information.

Specifically, the theme interaction information includes but not limited to questions or views, etc., while the theme feedback information can be feedback information submitted by the user based on the theme interaction information, specifically, the theme feedback information can be the comment information sent by the user based on the theme interaction information, including but not limited to text, expression, image, etc.

The action to be performed, that is, an action that can be performed by the virtual character, includes but not limited to dance movements, other movements related to the live-streaming theme, etc.

In order to strengthen the interaction between the virtual character and the user, the virtual character can be driven to send a question related to the live-streaming theme to the user, and the user is guided to reply to the question, and then the virtual character is driven to make the corresponding action to be performed according to the reply of the user.

Following the example above, the virtual character can send such question of "What winter outdoor sports do you like?" to the user, and acquire a reply content of the user, if a reply content contains "skiing", the virtual character can be driven to do skiing action; or, if the reply content contains "skating", the virtual character can be driven to do figure skating dance movements and so on.

Further, an action display control related to the live-streaming theme can be prompted to the user by the virtual character, where the action display control is associated with at least one action to be performed related to the live-streaming theme; a click instruction of the user for the action display control can be received to display the at least one action to be performed related to the live-streaming theme; and a click instruction submitted by the user for a target action to be performed can be received, and the virtual character can be driven to perform the target action to be performed, where the target action to be performed is one of the at least one action to be performed.

Specifically, in order to strengthen the interaction between the virtual character and the user to increase the interestingness of the live-streaming room, so as to enhance the interest of the user in watching the live-streaming, an embodiment of the present disclosure can drive the virtual character to perform certain action to be performed, including but not limited to dance movements, other actions related to the live-streaming theme, etc.

Among them, the action display control related to the live-streaming theme is displayed in the live-streaming interface, the user is guided to click on the action display control, and one or at least two actions to be performed related to the live-streaming theme are displayed to the user when the user is detected to click on the action display control, then, when the user is detected to clicked on any one or at least two target actions to be performed, the virtual character is driven to perform the action.

Following the above example, a clickable icon can be displayed in the live-streaming interface, and text information similar to "I can also perform professional actions, come and choose" can be displayed near the icon to guide the user to click on the icon. In a case that the user clicks on the icon, a clickable control corresponding to the action to be performed such as "skiing movements, figure skating movements, short track speed skating movements" related to the skiing competition activity can be displayed to the user. In a case that the user clicks on a clickable control corresponding to "cross-country skiing" is detected, the virtual character can be driven to perform the action of "cross-country skiing".

It should be noted that the virtual live-streaming control method provided by the embodiment of the present disclosure can be applied to any of the live-streaming scenes or a combination live-streaming of at least two live-streaming scenes of the following: e-commerce virtual live-streaming scenes, game virtual live-streaming scenes, education virtual live-streaming scenes, animation virtual live-streaming scenes, social virtual live-streaming scenes, event virtual live-streaming scenes, news information virtual live-streaming scenes, etc. In order to facilitate understanding, the present disclosure of the virtual live-streaming control method provided by the embodiment of the present disclosure to the e-commerce virtual live-streaming scenes is taken as an example to describe the specific virtual live-streaming control method in detail.

An embodiment of the present disclosure sets up a virtual character to perform information broadcasting of first type information and second type information related to a live-streaming theme in a live-streaming room, where the first type information has a knowledge attribute, and the second type information has a transaction attribute; drives the virtual character to broadcast at least one piece of the first type information and the second type information according to a preset broadcast rule; acquires a pre-generated material to be broadcast corresponding to the first type information and a transaction link of a target object associated with the second type information; displays the material to be broadcast in the live-streaming room when the virtual character broadcasts the first type information; and displays the transaction link in the live-streaming room when the virtual character broadcasts the second type information, where, in a case that a user is detected to click on the transaction link, the live-streaming room jumps to a transaction interface of an object transaction platform. In an implementation of the present disclosure, in the process of setting up the virtual character to broadcast information related to a certain live-streaming theme in the live-streaming room, in addition to broadcasting the first type information with the transaction attribute related to the live-streaming theme in the live-streaming room through the virtual character to realize object transactions, the second type information with the knowledge attribute can also be broadcast through the virtual character to realize the dissemination and popularization of this type information. Therefore, broadcasting different types of information related to the live-streaming theme is conducive to enhancing the interestingness and interaction of live-streaming, and at the same time is conducive to realizing the diversity of live-streaming methods, so as to better meet the user's requirements for different types of information.

The following, combined with the attached FIG. 3, takes an application of a virtual live-streaming control method in a winter outdoor competitive activity scene provided by the present application as an example to further explain the virtual live-streaming control method. FIG. 3 shows a process flow diagram of a virtual live-streaming control method provided by an embodiment of the present disclosure, including the following steps.

Step 302, setting up a virtual character to perform information broadcasting of news information and commodity information related to a winter outdoor competitive activity in a live-streaming room.

Step 304, driving the virtual character to broadcast at least one piece of the news information and the commodity information according to a preset broadcast rule.

Step 306, acquiring a pre-generated video material corresponding to the news information and a transaction link of a target commodity associated with the commodity information.

After Step 306 is performed, Step 308 or Step 316 can be performed.

Step 308, determining a broadcast order of the at least one piece of the news information according to a generation time and a historical broadcast record of the at least one piece of the news information when the virtual character broadcasts the news information.

Step 310, driving the virtual character to broadcast the at least one piece of the news information according to the broadcast order.

Step 312, adjusting a display ratio of the video material as well as a display position and/or a display size of the virtual character.

Step 314, displaying the virtual character and the video material in the live-streaming room according to an adjustment result, where, in a case that a user is detected to click on the transaction link, the live-streaming room jumps to a transaction interface of a commodity transaction platform.

Step 316, displaying the transaction link in the live-streaming room when the virtual character broadcasts the commodity information, where, in a case that a user is detected to click on the transaction link, the live-streaming room jumps to a transaction interface of a commodity transaction platform.

After Step 314 or Step 316 is performed, Step 318 can continue to be performed.

Step 318, prompting an action display control related to the winter outdoor competitive activity to the user by the virtual character, where the action display control is associated with at least one action to be performed related to the winter outdoor competitive activity.

Step 320, receiving a click instruction of the user for the action display control to display at least one action to be performed related to the winter outdoor competitive activity.

Step 322, receiving a click instruction submitted by the user for a target action to be performed, and driving the virtual character to perform the target action to be performed, where the target action to be performed is one of the at least one action to be performed.

In an implementation of the present disclosure, in the process of setting up the virtual character to broadcast information related to the live-streaming theme of the winter outdoor competitive activity in the live-streaming room, in addition to broadcasting the commodity information with the transaction attribute related to the winter outdoor competitive activity in the live-streaming room through the virtual character to realize commodity transactions, the news information with the knowledge attribute can also be broadcast through the virtual character to realize the dissemination and popularization of this type information. Therefore, broadcasting different types of information related to the live-streaming theme is conducive to enhancing the interestingness and interaction of live-streaming, and at the same time is conducive to realizing the diversity of live-streaming methods, so as to better meet the user's requirements for different types of information.

Figure 4:
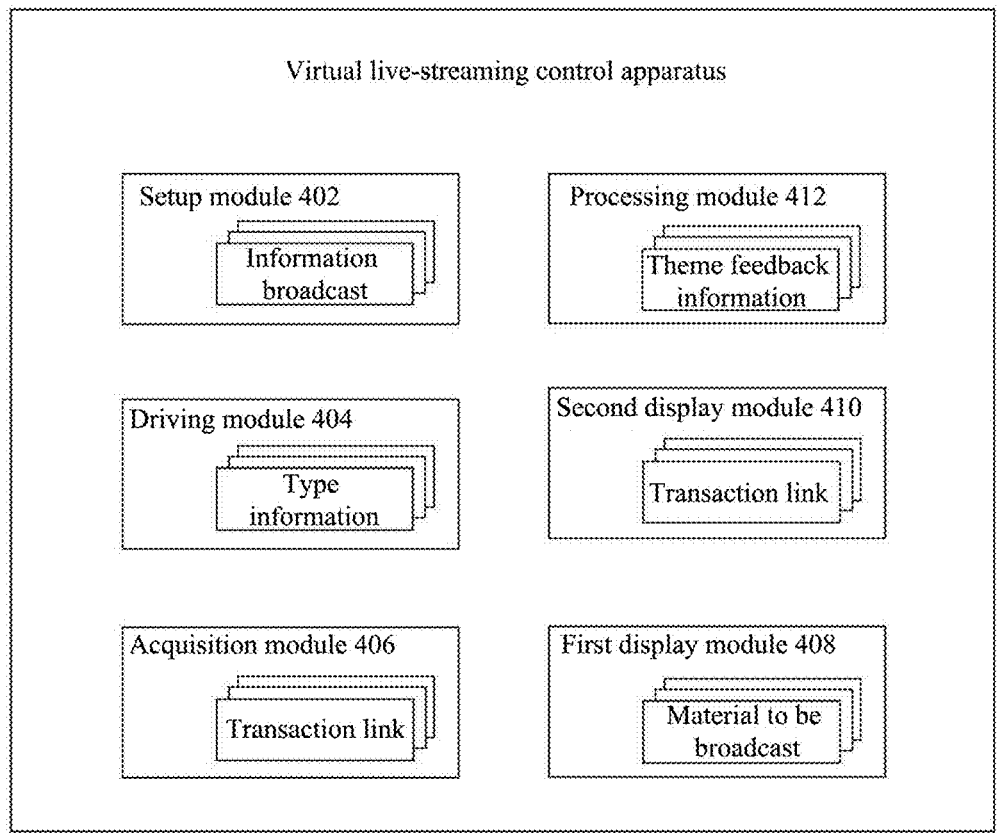
FIG. 4 is a structural diagram of a virtual live-streaming control apparatus provided by an embodiment of the present disclosure.

Corresponding to the above method embodiments, the present disclosure also provides an embodiment of a virtual live-streaming control apparatus. FIG. 4 shows a structural diagram of a virtual live-streaming control apparatus provided by an embodiment of the present disclosure. As shown in FIG. 4, the apparatus includes:

a setup module 402, configured to set up a virtual character to perform information broadcasting of first type information and second type information related to a live-streaming theme in a live-streaming room, where the first type information has a knowledge attribute, and the second type information has a transaction attribute;

a driving module 404, configured to drive the virtual character to broadcast at least one piece of the first type information and the second type information according to a preset broadcast rule;

an acquisition module 406, configured to acquire a pre-generated material to be broadcast corresponding to the first type information and a transaction link of a target object associated with the second type information;

a first display module 408, configured to display the material to be broadcast in the live-streaming room when the virtual character broadcasts the first type information; and a second display module 410, configured to display the transaction link in the live-streaming room when the virtual character broadcasts the second type information, where, in a case that a user is detected to click on the transaction link, the live-streaming room jumps to a transaction interface of an object transaction platform.

In an implementation, the driving module 404 is further configured to: drive the virtual character to broadcast at least one piece of the first type information according to the preset broadcast rule; drive the virtual character to broadcast at least one piece of the second type information in a case that it is detected that a broadcasting quantity of the first type information meets a first preset quantity threshold; and drive the virtual character to broadcast the at least one piece of the first type information in a case that it is detected that a broadcasting quantity of the second type information meets a second preset quantity threshold.

In an implementation, the first type information includes news information; accordingly, the driving module 404 is further configured to: determine a broadcast order of at least one piece of the news information according to a generation time and a historical broadcast record of the at least one piece of the news information; and drive the virtual character to broadcast the at least one piece of the news information according to the broadcast order.

In an implementation, the driving module 404 is further configured to: drive the virtual character to broadcast at least one piece of the first type information according to the preset broadcast rule; drive the virtual character to broadcast at least one piece of the second type information in a case that it is detected that a total broadcast duration of the first type information meets a first preset duration threshold; and return to perform the step of driving the virtual character to broadcast the at least one piece of the first type information in a case that it is detected that a total broadcast duration of the second type information meets a second preset duration threshold.

In an implementation, the material to be broadcast includes text material; accordingly, the first display module 408 is further configured to: display the text material in the live-streaming room according to a target display effect when the virtual character broadcasts the first type information, where the target display effect includes at least one of the following: display form, font, color, size, lace and dynamic effect.

In an implementation, the material to be broadcast includes picture material; accordingly, the first display module 408 is further configured to: adjust a display ratio of the picture material when the virtual character broadcasts the first type information, and display the picture material in the live-streaming room according to an adjustment result.

In an implementation, the material to be broadcast includes video material; accordingly, the first display module 408 is further configured to: adjust a display ratio of the video material as well as a display position and/or a display size of the virtual character when the virtual character broadcasts the first type information; and display the virtual character and the video material in the live-streaming room according to an adjustment result.

In an implementation, the virtual broadcast control apparatus further includes a processing module 412, configured to: acquire theme feedback information submitted by the user in the live-streaming room and predict interaction intention information of the user based on the theme feedback information; determine whether the interaction intention information matches current broadcast type information; and switch next broadcast information to another type information or shorten a broadcast duration of the current broadcast type information if the interaction intention information does not match the current broadcast type information.

In an implementation, the processing module 412 is further configured to: increase the broadcast duration of the current broadcast type information if the interaction intention information matches the current broadcast type information.

In an implementation, the processing module 412 is further configured to: determine current broadcast type information in the live-streaming room, such that the first display module 408 and the second display module 410 change a display background of the live-streaming room, a character image of the virtual character, a display effect of the material to be broadcast and/or the transaction link in the live-streaming room according to the current broadcast type information.

In an implementation, the processing module 412 is further configured to: prompt theme interaction information related to the live-streaming theme to the user by the virtual character; and acquire multiple pieces of theme feedback information of the user related to the theme interaction information; the driving module 404 is further configured to: drive the virtual character to perform a corresponding action to be performed based on the multiple pieces of theme feedback information.

In an implementation, the processing module 412 is further configured to: prompt an action display control related to the live-streaming theme to the user by the virtual character through the first display module 408, where the action display control is associated with at least one action to be performed related to the live-streaming theme; receive a click instruction of the user for the action display control, so that the first display module 408 displays the at least one action to be performed related to the live-streaming theme; and receive a click instruction submitted by the user for a target action to be performed, so that the driving module 404 drives the virtual character to perform the target action to be performed, where the target action to be performed is one of the at least one action to be performed.

The above is an illustrative scheme of a virtual live-streaming control apparatus of the present embodiment. It should be noted that a technical scheme of the virtual live-streaming control apparatus belongs to the same idea as a technical scheme of the above-mentioned virtual live-streaming control method. For details not described in detail in the technical scheme of the virtual live-streaming control apparatus, reference may be made to the description of the technical scheme of the above-mentioned virtual live-streaming control method.

Figure 5:
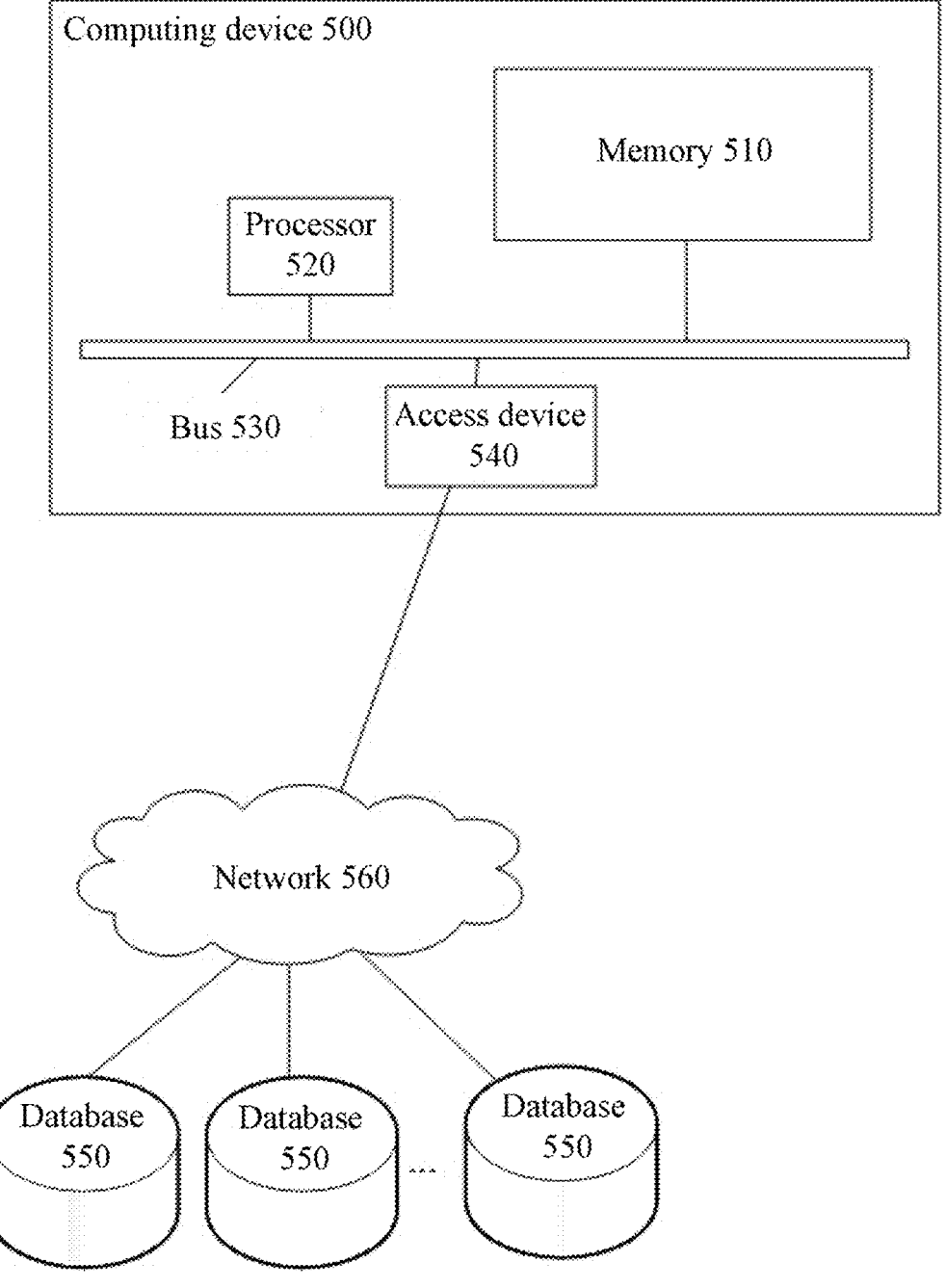
FIG. 5 is a structural block diagram of a computing device provided by an embodiment of the present disclosure.

FIG. 5 shows a structural block diagram of a computing device 500 provided according to an embodiment of the present disclosure. Components of the computing device 500 include but not limited to a memory 510 and a processor 520. The processor 520 is connected to the memory 510 via bus 530, and a database 550 is configured to store data.

The computing device 500 also includes an access device 540 that enables the computing device 500 to communicate over one or more networks 560. Examples of these networks include a combination of communication networks of Public Switched Telephone Networks (PSTN), Local Area Networks (LAN), Wide Area Networks (WAN), Personal Area Networks (PAN), or such as the Internet. The access device 540 may include one or more of any type of network interface (e.g., Network Interface Card (NIC)) of wired or wireless, such as IEEE802.11 Wireless Local Area Network (WLAN) wireless interface, Worldwide Interoperability for Microwave Access (Wi-MAX) interface, Ethernet interface, Universal Serial Bus (USB) interface, cellular network interface, Bluetooth interface, Near Field Communication (NFC) interface, and so on.

In an embodiment of the present disclosure, the above components of the computing device 500 and other components not shown in FIG. 5 may also be connected to each other, for example by a bus. It should be understood that the structural block diagram of the computing device shown in FIG. 5 is for example purposes only and is not a limitation of the scope of the present disclosure. Persons skilled in the art may add or replace other parts as needed.

The computing device 500 can be any type of stationary or mobile computing device, including mobile computers or mobile computing devices (e.g., tablets, personal digital assistants, laptop computers, notebook computer, netbooks, etc.), mobile phones (e.g., smartphones), wearable computing devices (e.g., smart watches, smart glasses, etc.) or other types of mobile devices, or stationary computing devices such as desktop computers or PCs. The computing device 500 can also be a mobile or stationary server.

The processor 520 is configured to execute the following computer-executable instruction, when the computer-executable instruction is executed by the processor, the steps of the above-mentioned virtual live-streaming control method are implemented.

The above is an illustrative scheme of a computing device of the present embodiment. It should be noted that a technical scheme of the computing device belongs to the same idea as a technical scheme of the above-mentioned virtual live-streaming control method. For details not described in detail in the technical scheme of the computing device, please refer to the description of the technical scheme of the above-mentioned virtual live-streaming control method.

An embodiment of the present disclosure further provides a computer-readable storage medium that stores computer-executable instructions, when the computer-executable instruction is executed by a processor, the steps of the above-mentioned virtual live-streaming control method are implemented.

The above is an illustrative scheme of a computer readable storage medium of the present embodiment. It should be noted that a technical scheme of the storage medium belongs to the same idea as a technical scheme of the above-mentioned virtual live-streaming control method. For details not described in detail in the technical scheme of the storage medium, reference may be made to the description of the technical scheme of the above-mentioned virtual live-streaming control method.

An embodiment of the present disclosure also provides a computer program, where a computer is caused to perform the steps of the above-mentioned virtual live-streaming control method when the computer program is executed on the computer.

The above is an illustrative scheme of a computer program of the present embodiment. It should be noted that a technical scheme of the computer program belongs to the same idea as a technical scheme of the above-mentioned virtual live-streaming control method. For details not described in detail in the technical scheme of the computer program, please refer to the description of the technical scheme of the above-mentioned virtual live-streaming control method.

Specific embodiments of the present disclosure are described above. Other embodiments are within the scope of the attached claims. In some cases, actions or steps described in the claim may be performed in a different sequence than in the embodiment and still achieve the desired result. In addition, the process described in the accompanying diagram does not necessarily require a specific sequence or sequential sequence to achieve the desired result. In some embodiments, multitasking and parallel processing are also possible or may be advantageous.

The computer instruction includes a computer program code, the computer program code can be source code form, object code form, executable file or some intermediate form. The computer readable medium may include: any entity or apparatus, recording medium, USB flash disk, portable hard drive, magnetic disk, optical disc, computer memory, Read-Only Memory (ROM), Random Access Memory (RAM), electric carrier signal, telecommunication signal and software distribution medium, etc., which capable of carrying the computer program code. It should be noted that the contents of the computer readable medium may be appropriately increased or decreased according to the requirements of the legislation and patent practice in the jurisdiction, for example, in some jurisdictions, according to the legislation and patent practice, the computer readable medium does not include electric carrier signals and telecommunications signals.

It should be noted that, for the purpose of simple description, each of the above-mentioned method embodiments is expressed as a series of combinations of actions, but those skilled in the art should be aware that the embodiments of the present disclosure are not limited by the sequence of actions described, because according to the embodiments of the present disclosure, some steps may be performed in a different sequence or simultaneously. Secondly, persons skilled in the art should also be aware that the embodiments described in the present disclosure are preferred embodiments, and that the actions and modules involved are not necessarily necessary for the embodiments of the present disclosure.

In the above embodiments, the description of each embodiment has its own emphasis, and the part not detailed in one embodiment can be referred to the relevant description of other embodiments.

The above disclosed preferred embodiments of the present disclosure are intended only to assist in the elaboration of the present disclosure. The above-mentioned embodiments do not elaborate on all the details and do not limit the present disclosure to the specific embodiments described. Obviously, according to the contents of the embodiments of the present disclosure, many modifications and changes can be made. These embodiments are selected and specifically described in the present disclosure for the purpose of better explaining the principle and practical application of the embodiments of the present disclosure, so that technicians in the technical field can better understand and use the present disclosure. The present disclosure is limited only by the claims and their full scope and equivalents.

The invention claimed is:

1. A virtual live-streaming control method, comprising:
setting up a virtual character to perform information broadcasting of first type information and second type information related to a live-streaming theme in a live-streaming room, wherein the first type information has a knowledge attribute, and the second type information has a transaction attribute;
driving the virtual character to broadcast at least one piece of the first type information and the second type information following a broadcast order according to a preset broadcast rule;
acquiring a pre-generated material to be broadcast corresponding to the first type information and a transaction link of a target object associated with the second type information;
displaying the material to be broadcast in the live-streaming room when the virtual character broadcasts the first type information; and
displaying the transaction link in the live-streaming room when the virtual character broadcasts the second type information, wherein, in a case that a user is detected to click on the transaction link, the live-streaming room jumps to a transaction interface of an object transaction platform.

2. The virtual live-streaming control method according to claim 1, wherein the driving the virtual character to broadcast the at least one piece of the first type information and the second type information according to the preset broadcast rule following the broadcast order comprises:
driving the virtual character to broadcast at least one piece of the first type information following the broadcast order according to the preset broadcast rule;
driving the virtual character to broadcast at least one piece of the second type information following the broadcast order in a case that it is detected that a broadcasting quantity of the first type information meets a first preset quantity threshold; and
returning to perform the step of driving the virtual character to broadcast the at least one piece of the first type information following the broadcast order in a case that it is detected that a broadcasting quantity of the second type information meets a second preset quantity threshold.

3. The virtual live-streaming control method according to claim 2, wherein the first type information comprises news information;
accordingly, the driving the virtual character to broadcast the at least one piece of the first type information following the broadcast order comprises:
determining a broadcast order of at least one piece of the news information according to a generation time and a historical broadcast record of the at least one piece of the news information; and
driving the virtual character to broadcast the at least one piece of the news information according to the broadcast order of the at least one piece of the news information.

4. The virtual live-streaming control method according to claim 1, wherein the driving the virtual character to broadcast the at least one piece of the first type information and the second type information following the broadcast order according to the preset broadcast rule comprises:
driving the virtual character to broadcast at least one piece of the first type information following the broadcast order according to the preset broadcast rule;
driving the virtual character to broadcast at least one piece of the second type information following the broadcast order in a case that it is detected that a total broadcast duration of the first type information meets a first preset duration threshold; and
returning to perform the step of driving the virtual character to broadcast the at least one piece of the first type information following the broadcast order in a case that it is detected that a total broadcast duration of the second type information meets a second preset duration threshold.

5. The virtual live-streaming control method according to claim 1, wherein the material to be broadcast comprises text material;
accordingly, the displaying the material to be broadcast in the live-streaming room when the virtual character broadcasts the first type information comprises:
displaying the text material in the live-streaming room according to a target display effect when the virtual character broadcasts the first type information, wherein the target display effect comprises at least one of the following: display form, font, color, size, lace and dynamic effect.

6. The virtual live-streaming control method according to claim 1, wherein the material to be broadcast comprises picture material;
accordingly, the displaying the material to be broadcast in the live-streaming room when the virtual character broadcasts the first type information comprises:
adjusting a display ratio of the picture material when the virtual character broadcasts the first type information, and displaying the picture material in the live-streaming room according to an adjustment result.

7. The virtual live-streaming control method according to claim 1, wherein the material to be broadcast comprises video material;
accordingly, the displaying the material to be broadcast in the live-streaming room when the virtual character broadcasts the first type information comprises:

adjusting a display ratio of the video material as well as a display position and/or a display size of the virtual character when the virtual character broadcasts the first type information; and displaying the virtual character and the video material in the live-streaming room according to an adjustment result.

8. The virtual live-streaming control method according to claim 1, further comprising;

acquiring theme feedback information submitted by the user in the live-streaming room and predicting interaction intention information of the user based on the theme feedback information;

determining whether the interaction intention information matches current broadcast type information; and switching next broadcast information to another type information or shortening a broadcast duration of the current broadcast type information if the interaction intention information does not match the current broadcast type information.

9. The virtual live-streaming control method according to claim 8, further comprising:

increasing the broadcast duration of the current broadcast type information if the interaction intention information matches the current broadcast type information.

10. The virtual live-streaming control method according to claim 1, further comprising:

determining current broadcast type information in the live-streaming room, and changing a display background of the live-streaming room, a character image of the virtual character, a display effect of the material to be broadcast and/or the transaction link in the live-streaming room according to the current broadcast type information.

11. The virtual live-streaming control method according to claim 1, further comprising:

prompting theme interaction information related to the live-streaming theme to the user by the virtual character;

acquiring multiple pieces of theme feedback information of the user related to the theme interaction information; and driving the virtual character to perform a corresponding action to be performed based on the multiple pieces of theme feedback information.

12. The virtual live-streaming control method according to claim 11, further comprising:

prompting an action display control related to the live-streaming theme to the user by the virtual character, wherein the action display control is associated with at least one action to be performed related to the live-streaming theme;

receiving a click instruction of the user for the action display control to display the at least one action to be performed related to the live-streaming theme; and receiving a click instruction submitted by the user for a target action to be performed, and driving the virtual character to perform the target action to be performed, wherein the target action to be performed is one of the at least one action to be performed.

13. A computing device, comprising:

a memory and a processor;

wherein the memory is configured to store computer executable instructions, and the processor is configured to execute the computer executable instructions, the processor, when executing the computer executable instructions, is configured to:

set up a virtual character to perform information broadcasting of first type information and second type information related to a live-streaming theme in a live-streaming room, wherein the first type information has a knowledge attribute, and the second type information has a transaction attribute;

drive the virtual character to broadcast at least one piece of the first type information and the second type information following a broadcast order according to a preset broadcast rule;

acquire a pre-generated material to be broadcast corresponding to the first type information and a transaction link of a target object associated with the second type information;

display the material to be broadcast in the live-streaming room when the virtual character broadcasts the first type information; and display the transaction link in the live-streaming room when the virtual character broadcasts the second type information, wherein, in a case that a user is detected to click on the transaction link, the live-streaming room jumps to a transaction interface of an object transaction platform.

14. A non-transitory computer-readable storage medium, wherein the computer-readable memory medium stores computer executable instructions, a processor, when executing the computer executable instructions, is configured to:

set up a virtual character to perform information broadcasting of first type information and second type information related to a live-streaming theme in a live-streaming room, wherein the first type information has a knowledge attribute, and the second type information has a transaction attribute;

drive the virtual character to broadcast at least one piece of the first type information and the second type information following a broadcast order according to a preset broadcast rule;

acquire a pre-generated material to be broadcast corresponding to the first type information and a transaction link of a target object associated with the second type information;

display the material to be broadcast in the live-streaming room when the virtual character broadcasts the first type information; and display the transaction link in the live-streaming room when the virtual character broadcasts the second type information, wherein, in a case that a user is detected to click on the transaction link, the live-streaming room jumps to a transaction interface of an object transaction platform.

15. The computing device according to claim 13, wherein the processor is configured to:

drive the virtual character to broadcast at least one piece of the first type information following the broadcast order according to the preset broadcast rule;

drive the virtual character to broadcast at least one piece of the second type information following the broadcast order in a case that it is detected that a broadcasting quantity of the first type information meets a first preset quantity threshold; and return to perform the step of driving the virtual character to broadcast the at least one piece of the first type information following the broadcast order in a case that it is detected that a broadcasting quantity of the second type information meets a second preset quantity threshold.

16. The computing device according to claim 15, wherein the first type information comprises news information;

accordingly, the processor is configured to:

determine a broadcast order of at least one piece of the news information according to a generation time and a historical broadcast record of the at least one piece of the news information; and drive the virtual character to broadcast the at least one piece of the news information according to the broadcast order of the at least one piece of the news information.

17. The computing device according to claim 13, wherein the processor is configured to:

drive the virtual character to broadcast at least one piece of the first type information following the broadcast order according to the preset broadcast rule;

drive the virtual character to broadcast at least one piece of the second type information following the broadcast order in a case that it is detected that a total broadcast duration of the first type information meets a first preset duration threshold; and return to perform the step of driving the virtual character to broadcast the at least one piece of the first type information following the broadcast order in a case that it is detected that a total broadcast duration of the second type information meets a second preset duration threshold.

18. The computing device according to claim 13, wherein the material to be broadcast comprises text material;

accordingly, the processor is configured to:

display the text material in the live-streaming room according to a target display effect when the virtual character broadcasts the first type information, wherein the target display effect comprises at least one of the following: display form, font, color, size, lace and dynamic effect.

19. The computing device according to claim 13, wherein the material to be broadcast comprises picture material;

accordingly, the processor is configured to:

adjust a display ratio of the picture material when the virtual character broadcasts the first type information, and display the picture material in the live-streaming room according to an adjustment result.

20. The computing device according to claim 13, wherein the material to be broadcast comprises video material;

accordingly, the processor is configured to:

adjust a display ratio of the video material as well as a display position and/or a display size of the virtual character when the virtual character broadcasts the first type information; and display the virtual character and the video material in the live-streaming room according to an adjustment result.

\* \* \* \* \*